Nov. 3, 1964     G. P. HUPPKE     3,155,472
GAS SCRUBBER SYSTEM
Filed July 27, 1959
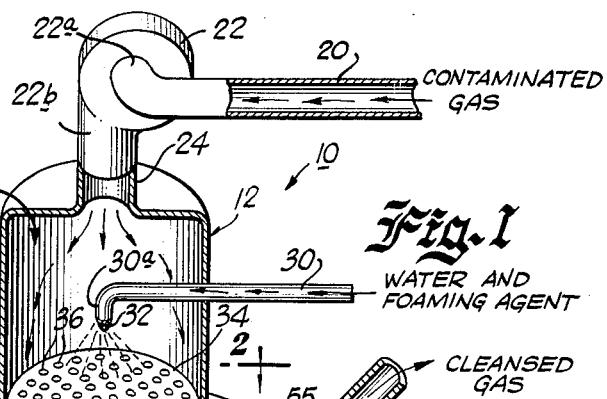
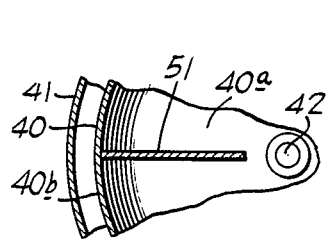
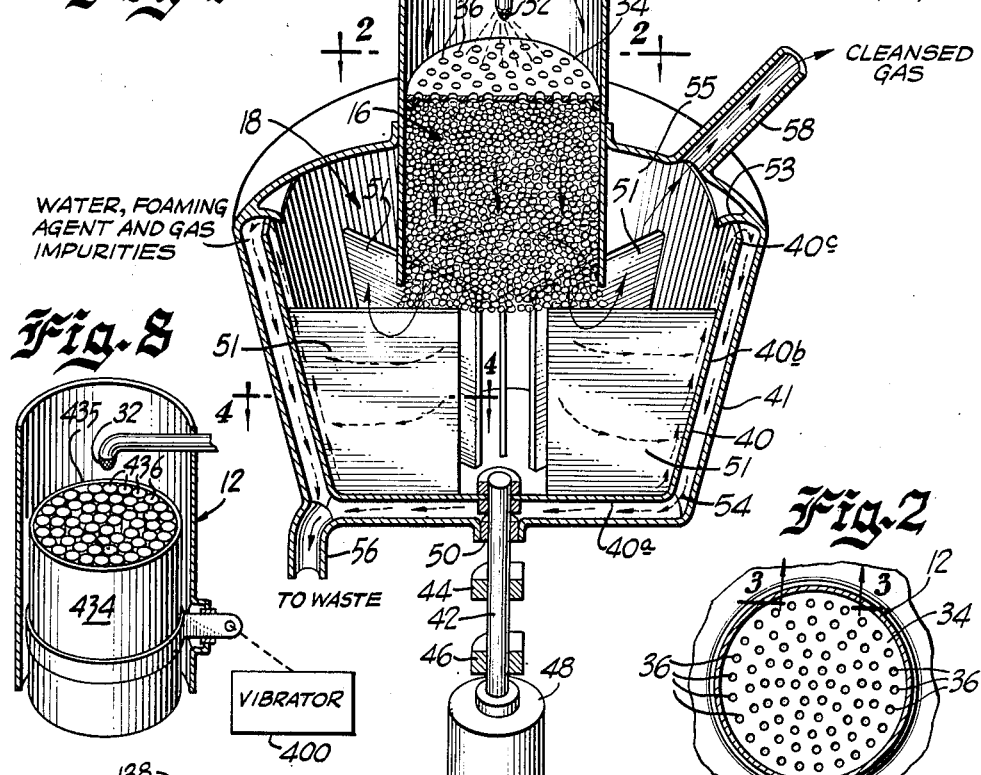
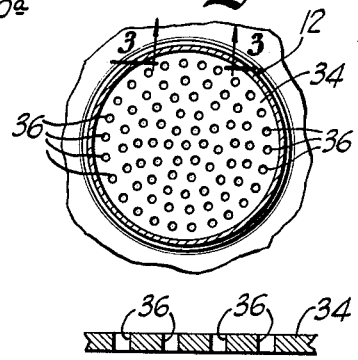
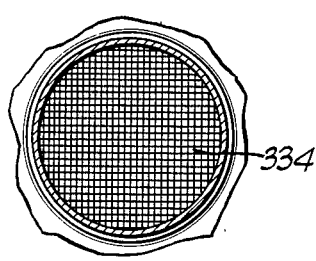
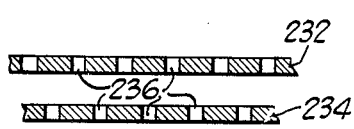
INVENTOR.
GLEN P. HUPPKE
BY Mason, Kolehmainen, Rathburn and Wyss
ATTORNEYS

United States Patent Office 3,155,472
Patented Nov. 3, 1964

3,155,472
GAS SCRUBBER SYSTEM
Glen P. Huppke, Beaver Falls, N.Y., assignor to Herbert Simpson Corporation, Chicago, Ill., a corporation of Illinois
Filed July 27, 1959, Ser. No. 829,628
1 Claim. (Cl. 55—178)

The present invention relates to an apparatus for removing solid contaminants from a fluid medium and, more particularly, relates to an apparatus for removing very small solid particles from a gas.

Many types of industrial gas filtering devices are presently available for removing solid contaminants from a gas stream. These devices generally fall into two different classes known as "inertial type scrubbers" where no liquid cleaning medium is employed and "wet scrubbers" where the solid particles are removed by contact with a liquid cleaning agent. Each of these classes possesses its own advantages and disadvantages and, for this reason, the type filter to be used is usually selected in accordance with the filtering task to be performed. All of the units prior to the present invention, however, are subject to a common limitation in that they are incapable of removing extremely fine particles from the gas. Wet scrubbers, for example, are unable to separate particles less than two microns in diameter because these scrubbers generally rely upon the kinetic properties of the particles to effect their separation. While the impaction or impingement of the particles against the surface of the liquid cleaning agent is achieved in a variety of different ways, the kinetic energy of the particles becomes so small when the particle diameter is less than two microns that efficient cleaning or particle removal cannot be obtained. Inertial type scrubbers also rely upon the kinetic properties of the particles to achieve the separation and, hence, they too lose their efficiency when very small particles are present in the gas.

The apparatus of the present invention is intended to supplement wet scrubbers of the type described above since this apparatus achieves a very high efficiency scrubbing action for particle sizes below that which the conventional scrubber can handle or collect. It has been found that the efficiency of the apparatus of the present invention increases with a decrease in diameter of the gas-borne contaminants.

When the diameter of the contaminant particles is less than two microns, these particles behave differently than their more massive counterparts since they tend to act more and more like a gas as their diameter is lessened. Brownian movement of the particles becomes more pronounced as their size decreases and for particles having a diameter less than about one-half of a micron, this movement greatly exceeds the normal settling velocity of the particle. Thus, these very small particles undergo constant random movement and should be treated in much the same manner as a gas.

It has been found that small wettable particles located near a water surface will diffuse into the liquid in exactly the same manner that a vapor of water will diffuse into a liquid body of water. The apparatus of the present invention takes advantage of this phenomenon to remove the small contaminant particles from the gas. The advantages of particle removal by diffusion can be realized only by exposing a unit volume of gas to a very large area or surface of the cleaning liquid, a condition which is achieved, in accordance with the present invention, by converting the cleaning liquid such as water to a foam that entraps the contaminated gas. The cleaning liquid is in the form of bubbles so that the area exposed to the gases is very large. For example, one cubic foot of light foam contains almost a cubic foot of gas and if the bubble diameter is .01 inch, the area of water surface exposed to the entrapped gas is 8000 square feet. With this tremendous cleaning area available, the particulate matter travels only a very short distance before colliding with a liquid cleaning surface. These conditions are ideal for the promotion of rapid diffusional separation and account for the high small particle separation efficiencies attained by the method and apparatus of the present invention.

It is, therefore, a primary object of the present invention to provide a new and improved apparatus for removing very small solid particles from dust laded air and the like.

It is another object of the present invention to provide a new and improved apparatus which employs a diffusion type filtering action between small particles and a large liquid cleaning surface for scrubbing air and the like.

It is yet another object of the present invention to provide a scrubber apparatus employing a continually generated foam filter for removing dust and solid contaminants from air and the like.

It is a further object in accordance with the previous object to provide for the scrubber apparatus a dynamic, as contrasted with static, foam filter.

It is still a further object of the present invention to provide a new and improved apparatus for removing very small contaminant particles from air and the like by diffusing the particles with a very large liquid cleaning surface formed by foaming the liquid into a plurality of cleaning bubbles.

It is another object of the present invention to provide a new apparatus wherein dust laded air or the like is passed through a foam filter to efficiently and quickly cleanse the air.

It is a further object of the present invention to provide an apparatus for scrubbing contaminated air and the like wherein a foam filter comprising many relatively small bubbles is continuously produced, the filter is continuously moved, and the contaminated air is continuously passed through the foam filter.

It is another object of the present invention to provide an apparatus for scrubbing contaminated air and the like by the use of a foam filter wherein the contaminated air itself coacts with a foaming material to produce the foam filter.

These and other objects are achieved by providing a new and improved apparatus for removing very small solid contaminants, such as dust, from a contaminated medium, such as dust laded air. Briefly, the contaminated air is introduced into a mixing chamber in a casing of a scrubbing apparatus and is directed within the casing through a foam filter comprising many relatively small bubbles which entrap the contaminated air and present a tremendously large cleaning area. The small particles are separated by diffusion into the large cleaning surfaces so that the dust and other solid contaminants are absorbed and collected. In one aspect of the present invention, the dust laded air coacts with a liquid mixture, for example, water mixed with a foaming agent which is introduced into the mixing chamber in the casing, to produce the small bubbles comprising the foam filter. In another aspect of the present invention, the foam filter is continuously built up during the scrubbing operation and, furthermore, continuously moves within a foam chamber through which the contaminated air passes. Thus, both the foam filter and the contaminated air are temporarily contained within the foam chamber where the solid particles are intercepted and entrapped by the bubbles. The contaminated foam filter and the cleaned air pass from the foam chamber into a separating chamber. Separating means are included in the separating chamber for the purpose of defoaming the foam filter or, more specifically, for the purpose of collapsing the many bubbles to separate the cleansed air from the defoamed foam filter. As a result, the defoamed filter material containing the dust and solid contaminants is directed out of the casing in liquid form while the cleansed air is directed out of the casing for discharge to the atmosphere or for transportation to suitable equipment. The foam material in the foam chamber is, of course, continuously replaced so that the contaminated air is always confronted by a relatively clean foam area.

The invention, both as to its organization and manner of operation, together with further objects and advantages will best be understood by reference to the following detailed description and claims taken in conjunction with the accompanying drawing wherein:

FIG. 1 is a partially diagrammatic view principally in section showing a gas scrubbing system characterized by the features of the present invention;

FIG. 2 is a sectional view taken along line 2—2 of FIG. 1, illustrating in plan a pervious means used to develop a foam filter;

FIG. 3 is an enlarged sectional view taken along line 3—3 of FIG. 2, illustrating a portion of the pervious means shown in FIG. 2;

FIG. 4 is a fragmentary sectional view taken along line 4—4 of FIG. 1;

FIG. 5 is a sectional view generally similar to FIG. 3 illustrating another embodiment of a pervious means which may be employed in the system shown in FIG. 1;

FIG. 6 is a sectional view of yet another embodiment of a pervious means which may be employed in the system shown in FIG. 1;

FIG. 7 is a plan view of still another embodiment of a pervious means which may be employed in the system shown in FIG. 1; and FIG. 8 is a diagrammatic view partly in section showing an alternative arrangement for generating the foam filter in a system of the type shown in FIG. 1.

Referring now to the drawing and particularly to FIG. 1, a new and improved gas scrubbing system characterized by the features of the present invention is there indicated generally by the reference numeral 10. Contaminated gas (hereinafter referred to as dust laded air) is continuously supplied to the scrubber system 10 for removal of the dust or solid contaminants suspended within the air in order to develop at the output of the system cleansed air which is discharged to the atmosphere or is transported to suitable apparatus.

Briefly, the system 10 includes a casing 12 defining a mixing chamber 14 wherein the dust laded air and a mixture of liquid, e.g., water, and a suitable foaming agent, are simultaneously introduced into the casing. The air and the mixture coact to produce in a foaming chamber 16 a foam filter for entrapping and collecting dust and other small solid contaminants. The foam filter moves continuously out of the foaming chamber 16 into a separation chamber 18 where it is defoamed or collapsed and where the cleansed air is separated.

More specifically, dust laded air is transported to the scrubbing system through a conduit 20 which is connected to the inlet or suction side 22a of a blower 22. The speed of operation of the blower 22 is adjustable so that air may be delivered to the mixing chamber 14 at any desired velocity irrespective of the size, number and type of solid contaminants suspended in the air stream. The dust laded air leaves the blower 22 through an outlet 22b and is directed into a mixing chamber through a connecting passageway 24, comprising either an integral part of the casing 12 or a separate detachable conduit, the contaminated air flowing downwardly (as viewed in FIG. 1) through the mixing chamber 14 as indicated by the solid arrow-headed lines. The connecting passageway 24 is preferably flared downwardly and outwardly so that the contaminated air is uniformly distributed through the mixing chamber 14 as it moves downwardly.

For the purpose of developing a foam filter, a mixture of fluid, e.g., water and a suitable foaming agent, such as a sulfanate detergent of the type sold commercially under the trademarks Tide, Fab and the like, is also introduced into the mixing chamber 14 through a conduit 30. The conduit 30 is supported from the wall of the casing 12 and extends laterally to the center axis of the chamber 14 where its end 30a is angulated to point downwardly. A nozzle 32 is suitably secured to end 30a of the conduit 30 to distribute the mixture of water and foaming agent as a spray to cover a wide area of the mixing chamber 14. Actually, the mixture is directed downwardly by the nozzle 32 and is collected on a fluid pervious means comprising a perforated plate 34 disposed at the bottom of the mixing chamber 14. The nozzle 32 is constructed to distribute the mixture uniformly over the perforated plate 34. Specifically, the mixture of water and foaming agent strike the perforated plate and, although some splashing of the water and foaming agent results, a large portion of the mixture remains on the upper surface of the generally horizontal perforated plate 34. The mixture of water and foaming agent does not build up on the plate 34 because of the perforations 36 which permit the mixture to flow downwardly into the foaming chamber 16.

Considering now the perforated plate 34 in greater detail, it comprises, as is best shown in FIG. 2, a generally circular plate having a plurality of spaced apart openings 36. The openings 36 are preferably equidistantly spaced apart to provide a uniformly distributed stream of contaminated air passing through the perforated plate 34 but, it will be appreciated that the openings could be randomly or non-uniformly spaced apart to establish any desired distribution of this air stream. The openings 36 form a plurality of orifices through which the dust laded air, water, and foaming agent pass. The passage of the contaminated air, water and foaming agent through the openings 36 causes many relatively small bubbles to be formed immediately adjacent to the under surface of the perforated plate 34, thereby to provide a mass of foam material which is referred to hereinafter as a foam filter.

Referring more particularly to the construction of the openings 36, they preferably are formed so as to create a maximum turbulence in the contaminated air passing through the openings 36. By providing a turbulent air flow through the openings, the water and foaming agent are agitated to establish an ideal condition for the development of the many small bubbles making up the foam filter. As is best shown in FIGS. 1, 2 and 3, the openings 36 or orifices are generally cylindrical and may be considered as being "sharp edged" in the sense that they terminate at the upper and lower surfaces of the plate 34. In a system constructed in accordance with the present invention, the openings 36 were produced by a suitable drill and have diameters of three-eighths of an inch. The openings 36 are spaced relative to one another on the perforated plate so that they collectively comprise approximately five percent of the area of the plate 34. By using openings having three-eighths inch diameters and by setting the blower to produce a velocity for the dust laded air of approximately two thousand feet per minute, it is possible to produce at the under surface of the perforated plate 34 a foam filter having an average bubble diameter of approximately one thirty-second of an inch, which bubbles have a relatively thin wall thickness. These bubbles fill up the chamber 16 to form a thick foam filter through which the dust laded air passes.

From the foregoing description, it will be appreciated that in one aspect of the present invention, the turbulent, dust laden air itself coacts with water and foaming agent mixture to produce the foam filter, the size and character of the foam filter being dependent upon the velocity and type of dust laded air supplied to the scrubber system 10 and the quantity, type and the relative composition of the water and foaming agent mixture. The foam filter is thus made up of bubbles which readily permit the passage of dust or other solid contaminants through their walls by diffusion to entrap the particles and, hence, to cleanse the contaminated air. As was indicated previously, the cleaning of the air by diffusion is particularly useful in removing very small particles which are entrapped within the bubbles when they impinge against the bubble surface. The present invention is effective to remove these small particles because it exposes a very large surface area of the cleaning liquid to the gas stream. The thickness and composition of the foam filter is such that the very small particles, which are behaving much like a gas in that their movement is largely Brownian, are likely to travel only a very short distance before colliding with the cleaning surface of one of the bubbles. This action provides an effective separation of the dust by diffusion into and entrapment within the bubbles of the filter.

In accordance with another aspect of the present invention, the foam filter continuously builds up and moves downwardly through the foaming chamber 16 since new bubbles are constantly being formed adjacent and beneath the plate 34. The older and dirtier bubbles are forced downwardly by the production of the new bubbles and by the force of the moving air stream passing through the perforations 36. This action results in the production of a dynamic (as contrasted with static), continually moving foam filter which is constantly being replenished to present a clean filter area to the dust laded air. The foaming chamber 16 is generally cylindrical in shape and is of such length as to permit all or substantially all of the dust or solid contaminants in the contaminated air to be collected by the foam filter. In order effectively to remove different types of solid contaminants from different types of contaminated air, the different types of air streams must "soak" in the foam filter for different periods of time and, accordingly, it is necessary that the foam chamber 16 have a proper length to assure that the necessary "soaking" time is provided. The scrubber system, thus, is so constructed to have a foaming chamber which is large enough to meet the filter requirements of the installation. Of course, it will be understood that the velocity of the contaminated air can be altered to change the rate at which the bubbles are produced and also the speed of passage of the foam filter through the foaming chamber.

In order to defoam the foam filter; that is, to collapse the many relatively small bubbles comprising the filter; and to separate the air from the filter material and collected particles, the foam filter and air are fed into the separating chamber 18. In the separation chamber 18, the foam filter is changed from a foam composition back to its basic liquid composition. This liquid composition, however, now includes the water, the foaming agent and the dust or solid contaminants collected by the foam filter, these components being referred to conveniently hereafter as the defoamed waste material. The defoamed waste material is discharged to waste or to suitable treating apparatus while the cleansed air which is separated from the foam filter and/or defoamed waste material is exhausted to the atmosphere or transported to suitable apparatus.

Referring more particularly to the separating chamber 18 shown in FIG. 1, it comprises a centrifuge drum 40 enclosed within an enlarged barrel portion 41 formed in the casing 12 adjacent the foaming chamber 16. The centrifuge drum 40 is of inverted, frustro-conical configuration and is spaced from the barrel portion 41, which, as shown, is similar in configuration but somewhat larger than the drum 40, to provide a passageway for the defoamed waste material. It should be understood, however, that the barrel portion 41 is only illustrative of one of many types of constructions that might be used with the centrifuge drum.

The centrifuge drum 40 is supported on a shaft 42 rotatably journalled within a pair of spaced bearings 44 and 46. The shift 42 is drivingly connected to a motor 48 through a suitable gear reduction (not shown) to rotate the centrifuge drum in a selected direction at a desired speed. The shaft 42 passes into the bottom of the barrel portion 41 through a water-tight, resilient seal 50. In operation, relatively small bubbles making up the foam filter and the air move downwardly through the mixing chamber 16 and are discharged directly into the rotating centrifuge drum where they are intercepted by a plurality of fins 51 extending radially inward from the inclined side wall 40b of the drum 40, as shown in FIGS. 3 and 4. These fins 51 are whirling around and as they strike the foam filter, substantially all of the bubbles are collapsed. The foam filter components intercepted by the fins are thrown by centrifugal force outwardly toward the wall 40b of the drum 40, the path being indicated by the dotted arrow-headed lines. Any bubbles that are not collapsed by the impact of the fins 51 are collapsed against the wall 40b when the foam filter is thrown outwardly. Substantially all of the cleansed air also is intercepted by the fins 51 and is directed by centrifugal force toward the wall 40b. However, since the defoamed waste material has a higher specific gravity than the cleansed air, this waste material remains within the lower portion of the drum 40 while the cleansed air is separated by upward movement within the drum 40 into a chamber 55 defined by the barrel portion 41, the path of movement of the cleansed air being indicated by solid arrow-headed lines. The chamber 55 opens to a conduit 58 which exhausts the cleansed air to the atmosphere or transports it to suitable receiving equipment.

The defoamed waste material including the dust particles and the like moves upwardly along the drum wall 40b which is inclined to prevent the build-up of the dust or solid contaminants. To this end, the wall 40b is built at an angle slightly greater than the angle of repose of the defoamable waste material at the operating speed of the drum 40. The waste material moves upwardly by centrifugal force along the wall 40b, as indicated by the dotted arrow-pointed lines, passes over the upper lip 40c of the wall 40b, and is directed against a baffle ring 53. The baffle ring 53 is formed on the interior of the barrel portion 41 adjacent to the lip 40c in order to prevent entrainment of the waste material back into the cleansed air which has been separated from the foam filter. The waste material is deflected downwardly by the baffle ring 53 into a somewhat annular passageway 54 defined between the outer surface of the drum 40 and the inner surface of the barrel portion 41. Actually, the water drains down the side wall of the barrel portion 41 and across the generally horizontal floor of this barrel portion into an exhaust or waste conduit 56. The conduit 56 exhausts the waste material or, in the alternative, transports it to suitable filtering equipment wherein the dust and other solid contaminants are removed from the water and foaming agent by a filtering apparatus, such as the apparatus disclosed in the McIlvaine Patent No. 2,693,946, to obtain a purified water and foaming agent mixture which may be reused in the scrubber system 10.

A modified liquid pervious means is illustrated in FIG. 5 and comprises a plate 134 of generally similar construction to the perforated plate 34. The plate 134 differs principally from the plate 34 in that it includes a plurality of orifices 136 each of which is surrounded by a raised boss or lip 138 formed on the upper surface of the plate 134. By this construction, a greater amount of the water and foaming agent mixture can be collected on the perforated plate and because of the general knife edge provided by the lip 138, good turbulence is obtained to assure the development of an ample supply of bubbles by the coaction between the contaminated air and the water and foaming agent mixture.

FIG. 6 illustrates yet another modified form of the liquid pervious means. The pervious means there shown comprises a pair of plates 232 and 234 each of which is identical in construction to the plate 34 illustrated in FIGS. 1, 2 and 3. The plates 232 and 234 are spaced uniformly apart and each includes a plurality of openings 236, the openings 236 on the plate 232 passing the contaminated air and the water and foaming agent mixture, and the opening 236 in the plate 234 passing the contaminated air, the bubbles produced by the first plate 232, and the balance of the mixture of water and cleansing agent. It has been found that for particular types of contaminated gases a double plate is highly effective to produce an adequate amount of foam having the desired uniformity, density and the like.

Instead of using a perforated plate as the pervious means, a screen 334 of fine mesh may be employed as shown in FIG. 7. The screen 334 may take many forms but in a preferred embodiment comprises a plurality of generally interwoven and right angularly related strands 335 which define a plurality of openings 336 through which the contaminated air and mixture of water and foaming agent pass. The mixture collects on the strands 335 and coacts with the contaminated air to produce a supply of relatively small bubbles forming the foam filter.

The foam filter may also be produced by an arrangement of the type shown in FIG. 8 wherein the pervious means comprises a bank 434 of tubes 436 suitably held together in side-by-side relationship. These tubes may be inserted within an outer cylinder or shell or, alternatively, they may be held together by relatively narrow bands or rings. In any event, they form a plurality of passageways for the contaminated air stream and the foaming mixture from the nozzle 32. The bank of tubes is adapted to be vibrated horizontally or laterally of the casing 12 by means of any suitable vibrating mechanism indicated generally by the reference numeral 400. This vibration, of course, mixes the air stream and the foaming mixture and results in the production of a very large number of bubbles making up the foam filter. The remainder of the apparatus shown in FIG. 8 may be identical with that shown in FIG. 1 and the operation will, therefore, be evident from the foregoing description.

While particular embodiments of the invention have been shown, it will be understood, of course, that the invention is not limited thereto since many modifications may be made, and it is, therefore, contemplated by the appended claim to cover any such modification as fall within the true spirit and scope of the invention.

What is claimed as new and desired to be secured by Letters Patent of the United States is:

Apparatus for removing solid contaminants from a contaminated fluid medium, said apparatus comprising elongated casing means, means for admitting said medium into said casing means, means for admitting an unfoamed foamable material into said casing means, a fluid pervious means occupying substantially the entire cross-sectional area of said casing means for collecting said material and consisting of a plurality of elongated tubes held together in side-by-side relation arranged longitudinally of said casing means, means for vibrating said tubes, said fluid passing through said tubes and coacting with said unfoamed material to effect the foaming of the material in order to produce a body of foam, and means for unfoaming the foamable material by collapsing the bubbles thereof.

References Cited in the file of this patent

UNITED STATES PATENTS

| | | |
|---|---|---|
| 900,062 | Ernst | Sept. 29, 1908 |
| 1,144,193 | Haas | June 22, 1915 |
| 1,847,648 | Harkom | Mar. 1, 1932 |
| 1,959,945 | Bowman | May 22, 1934 |
| 2,029,336 | Palsson | Feb. 4, 1936 |
| 2,379,396 | Ziliotto | June 26, 1945 |
| 2,478,998 | Boyd et al. | Aug. 16, 1949 |
| 2,510,396 | Goodrie | June 6, 1950 |
| 2,564,765 | Mercier | Aug. 21, 1951 |
| 2,634,907 | Smith | Apr. 14, 1953 |
| 2,712,897 | Kusserow et al. | July 12, 1955 |
| 3,018,843 | Mercier | Jan. 30, 1962 |

FOREIGN PATENTS

| | | |
|---|---|---|
| 405,389 | Great Britain | Feb. 8, 1934 |
| 430,379 | Great Britain | June 18, 1935 |
| 131,502 | Sweden | May 2, 1951 |
| 1,038,802 | France | May 13, 1953 |